(12) United States Patent
Gaito et al.

(10) Patent No.: US 12,563,401 B2
(45) Date of Patent: Feb. 24, 2026

(54) HASH FUNCTION AND LAWFUL INTERCEPTION

(71) Applicant: Telefonaktiebolaget LM Ericsson (PUBL), Stockholm (SE)

(72) Inventors: Daniele Gaito, Pagani (IT); Chiara Santella, Nocera Inferiore (IT); Antonio Giorgio Gaggia, Salerno (IT); Carmine Galotto, Pagani (IT); Mariano Russo, Naples (IT)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 107 days.

(21) Appl. No.: 18/578,261

(22) PCT Filed: Jul. 12, 2021

(86) PCT No.: PCT/SE2021/050721
§ 371 (c)(1),
(2) Date: Jan. 10, 2024

(87) PCT Pub. No.: WO2023/287328
PCT Pub. Date: Jan. 19, 2023

(65) Prior Publication Data
US 2024/0305993 A1 Sep. 12, 2024

(51) Int. Cl.
*H04W 12/80* (2021.01)
*H04L 9/32* (2006.01)

(52) U.S. Cl.
CPC ........... *H04W 12/80* (2021.01); *H04L 9/3242* (2013.01)

(58) Field of Classification Search
CPC ............................ H04W 12/80; H04L 9/3242
(Continued)

(56) References Cited

U.S. PATENT DOCUMENTS

| | | | |
|---|---|---|---|
| 2009/0190479 A1* | 7/2009 | Parsons | H04M 3/2281 |
| | | | 379/35 |
| 2015/0220625 A1 | 8/2015 | Cartmell et al. | |
| 2020/0267189 A1 | 8/2020 | Senatore et al. | |

FOREIGN PATENT DOCUMENTS

| | | |
|---|---|---|
| EP | 2023527 A1 | 2/2009 |
| EP | 2566126 A1 | 3/2013 |
| | (Continued) | |

OTHER PUBLICATIONS

P. Leach et al. "A Universally Unique IDentifier (UUID) URN Namespace" Request for Comments: 4122; Category: Standards Track—Jul. 2005.

(Continued)

*Primary Examiner* — Michael S McNally
(74) *Attorney, Agent, or Firm* — Baker Botts L.L.P.

(57) ABSTRACT

Methods (400, 700) and devices (110, 120, 300, 610, 620, 810, 850, 1000, 1100) determine a hash function to be used before storing and transmitting target identifiers. A lawful interception, LI, core device (120, 300, 620) then calculates a target identifier hashed value, TIHV, using the hash function and a hashing key, stores an indication of the hash function, the hashing key and the TIHV, and transmits the indication, the hashing key and the TIHV to the network element that is configured to intercept LI data. The network element applies the hash function with the hashing key to intercepted target identifiers retrieved from intercepted LI data. If one of the intercepted target identifiers hashed values matches a TIHV received from the LI core device, the network element forwards LI data to the LI core device, which similarly matches and forwards LI data to a law enforcement monitoring facility.

16 Claims, 12 Drawing Sheets

(58) Field of Classification Search
USPC ........................................................ 713/153
See application file for complete search history.

(56)                          References Cited

FOREIGN PATENT DOCUMENTS

| WO | WO2018224862 A1 | 12/2018 |
| WO | WO2019093932 A1 | 5/2019 |

OTHER PUBLICATIONS

ETSI TS 103 221-1 v1.8.1 (Apr. 2021) Lawful Interception (LI); Internal Network Interfaces; Part 1: X1.
ETSI GR NFV-SEC 011 v1.1.1 (Apr. 2018) Network Functions Virtualisation (NFV); Security; Report on NFV LI Architecture.
PCT International Search Report issued for International application No. PCT/SE2021/050721—Mar. 9, 2022.
PCT Written Opinion of the International Searching Authority issued for International application No. PCT/SE2021/050721—Mar. 9, 2022.

\* cited by examiner

FIGURE 4

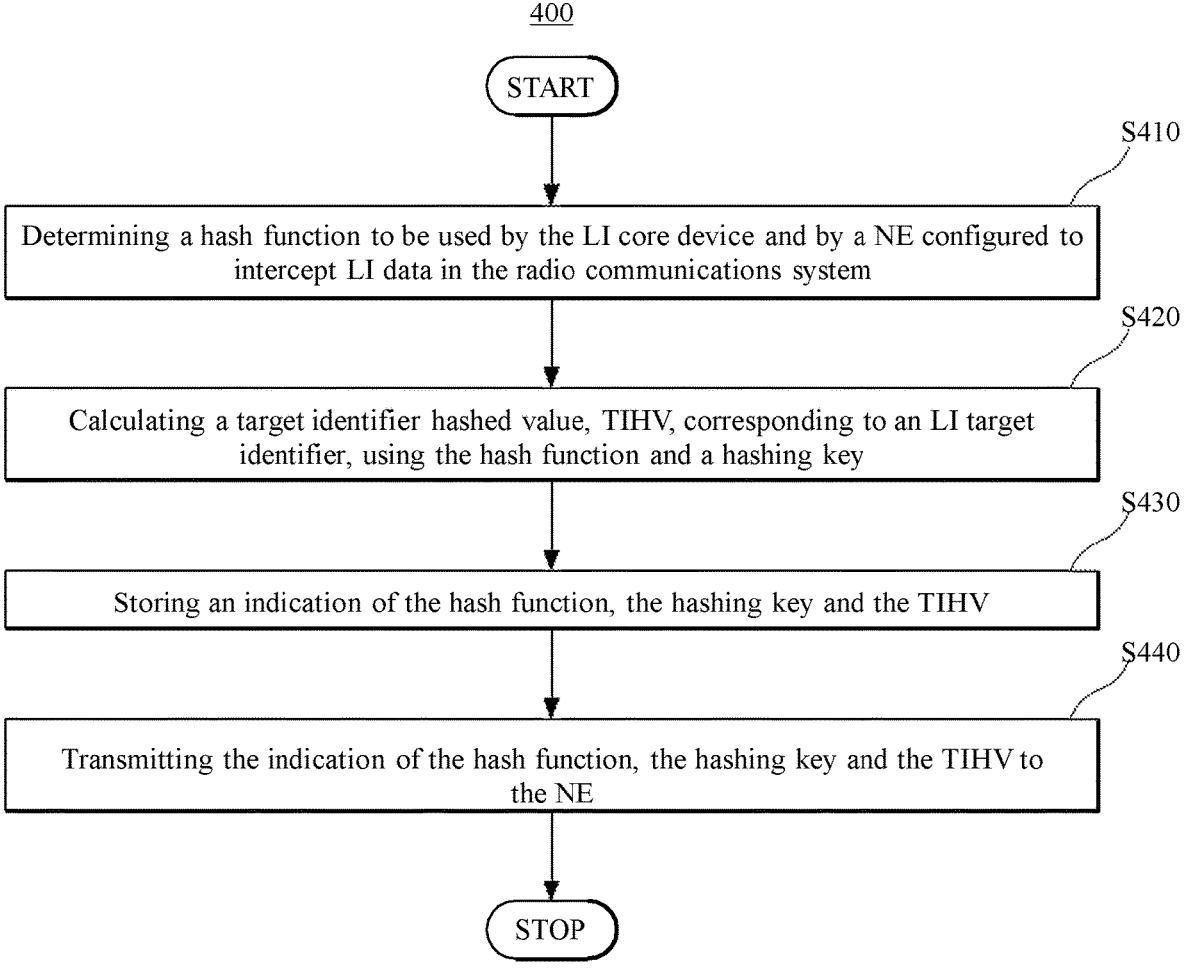

400

START

S410

Determining a hash function to be used by the LI core device and by a NE configured to
intercept LI data in the radio communications system

S420

Calculating a target identifier hashed value, TIHV, corresponding to an LI target
identifier, using the hash function and a hashing key

S430

Storing an indication of the hash function, the hashing key and the TIHV

S440

Transmitting the indication of the hash function, the hashing key and the TIHV to
the NE

STOP

FIGURE 7

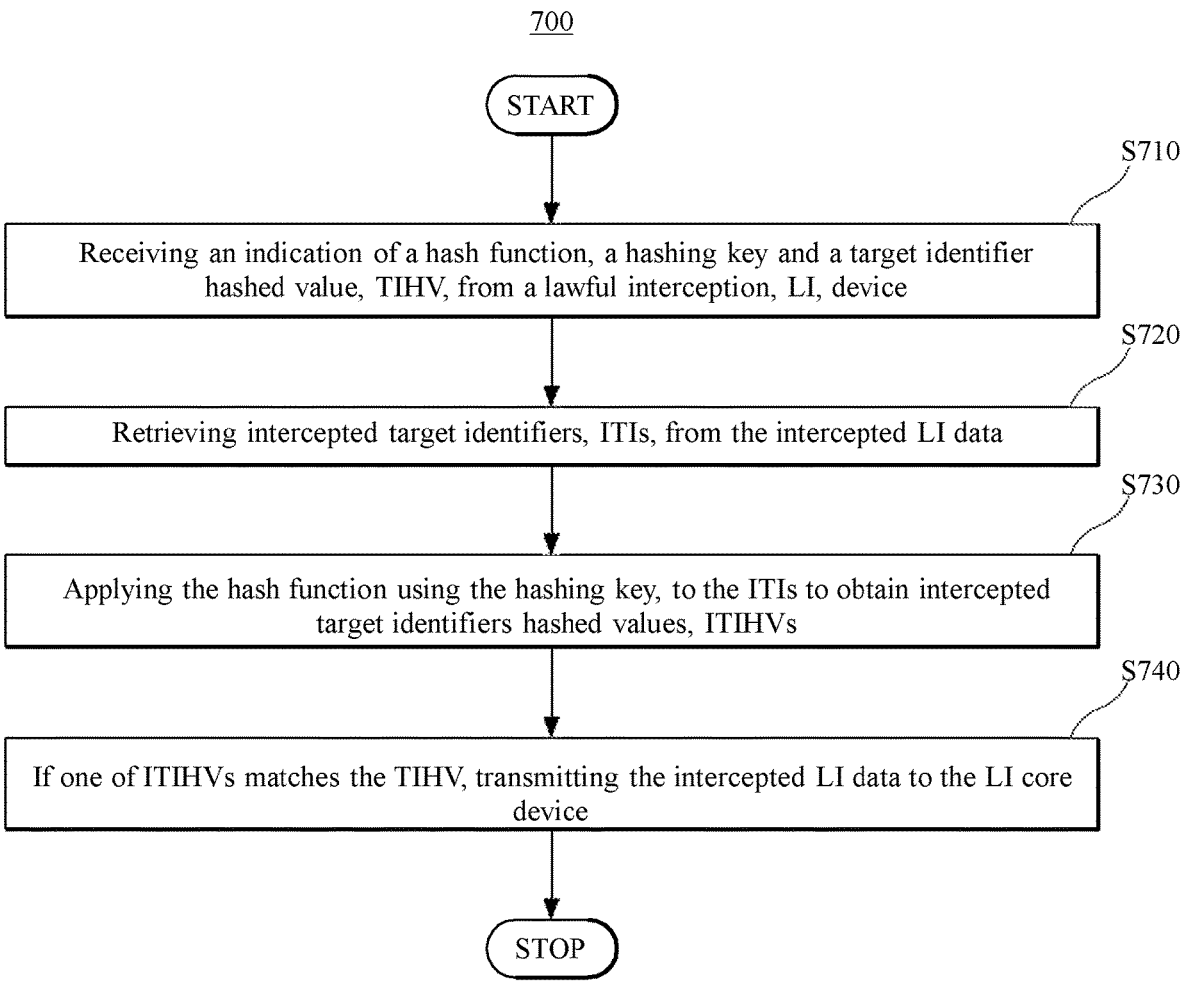

700

START

S710

Receiving an indication of a hash function, a hashing key and a target identifier
hashed value, TIHV, from a lawful interception, LI, device

S720

Retrieving intercepted target identifiers, ITIs, from the intercepted LI data

S730

Applying the hash function using the hashing key, to the ITIs to obtain intercepted
target identifiers hashed values, ITIHVs

S740

If one of ITIHVs matches the TIHV, transmitting the intercepted LI data to the LI core
device

STOP

1000

1100

1200

HASH FUNCTION AND LAWFUL INTERCEPTION

PRIORITY

This nonprovisional application is a U.S. National Stage Filing under 35 U.S.C. § 371 of International Patent Application Serial No. PCT/SE2021/050721 filed Jul. 12, 2021 and entitled "Hash Function and Lawful Interception," which is hereby incorporated by reference in its entirety.

TECHNICAL FIELD

The embodiments described in this document generally relate to lawful interception (LI) in a radio communication system; more specifically, to methods, LI core devices, network elements and computer programs that determine a hash function to be used when storing and transmitting LI target identifiers by an LI core device and by a network element.

BACKGROUND

Lawful interception refers to hardware and software support in radio communication systems (e.g., wireless networks) enabling law enforcement agencies with legal authorization to selectively intercept communications or acquire communication-related information of targeted subscribers. Operators (called Communication Service Providers, CSPs) provide LI nodes and interfaces for LI that often perform according to standards. However, target identifiers stored in CSP's nodes or transmitted there-between may be subverted for illicit purposes. Therefore, such sensitive information is often encrypted (e.g., hashed) instead of plaintext.

Network Functions Virtualization (NFV) allows CSPs to abstract any type of network services into software that runs on cloud infrastructure, i.e., software together with deployment instructions in the form of virtual network functions (VNF). In an NFV implementation, network components, services and applications can be rapidly provided and deployed. However, in an NFV environment, tenants and service providers may belong to different trust domains, posing additional security and access challenges due to the sharing of resources among potentially untrusted tenants and domains. In other words, NFV introduces new vulnerabilities into radio communication infrastructures due to a lack of physical security, given the sharing of physical and logical resources. Sensitive data (e.g., target identifiers for LI) may be read or even modified without authorization. Access control within the NFV may not be enough if the infrastructure does not provide isolation mechanisms or encryption to prevent a malicious tenant or malicious NFV from obtaining intercepted target identifiers through the infrastructure. Moreover, the use of encryption mechanisms in a virtualized infrastructure requires appropriate and usually complex key management.

A problem with conventional hashing is that when the hash function (i.e., a function executing a hashing algorithm) used to encrypt information for and by an NE (i.e., network element hosting the point of interception) is upgraded, all the existing tasks' hashed information has to be deleted and replaced both in the NE and in the LI core (i.e., CSP's software and hardware intermediating between the points of interceptions and the law enforcement agency). This updating process causes a temporary LI monitoring outage. 5G networks can change frequently and quickly; and manual setting of hashing algorithm for a new NE that is introduced in the 5G network is in contradiction with automatic "Dynamic Network Topology Management". That is, nodes can be added or removed (scaling in or out), and this change in 5G network is very fast due to virtualization and cloud, but the manual setting for selection of hashing algorithm do not allow to have a very fast and automated change in 5G network, since human intervention is needed on new nodes and also on existing nodes.

It is therefore desirable to address the above-identified conventional LI implementation drawbacks related to hash function changes.

SUMMARY

An object of the invention is to enable a handshake mechanism related to selecting a hash function (hashing algorithm) used by both an LI core device and an NE.

According to an embodiment, there is a method performed by an LI core device in a radio communication system. The method includes determining a hash function to be used by the LI core device and by a network element, NE, that is configured to intercept LI data in the radio communication system. The method further includes calculating a target identifier hashed value, TIHV, corresponding to an LI target identifier, using the hash function and a hashing key and storing an indication of the hash function, the hashing key and the TIHV. The method then includes transmitting the indication of the hash function, the hashing key and the TIHV to the NE.

According to another embodiment, there is a method performed by an NE configured to intercept communications. The method includes receiving an indication of a hash function, a hashing key and a TIHV, from an LI core device, retrieving intercepted target identifiers, ITIs, from intercepted LI data, and applying the hash function using the hashing key to the intercepted TIs to obtain intercepted TI hashed values, ITIHVs. The method further includes transmitting the intercepted LI data to the LI core device if one of the ITIHVs matches the TIHV.

According to yet another embodiment, there is an LI core device in a radio communication system, the LI core device having input/output circuitry, a processor and a memory storing executable instructions. The processor executing the executable instructions determines a hash function to be used by the LI core device and by an NE that is configured to intercept LI data in the radio communication system, calculates a TIHV corresponding to an LI target identifier, using the hash function and a hashing key and stores an indication of the hash function, the hashing key and the TIHV in the memory. The processor executing the executable instructions further transmits the indication of the hash function, the hashing key and the TIHV via the input/output circuitry to the NE According to another embodiment, there is an NE in a radio communication system, the NE having input/output circuitry, a processor and a memory storing executable instructions. The processor executing the executable instructions receive an indication of a hash function, a hashing key with a TIHV from the LI core device via the input/output circuitry, retrieves ITIs from intercepted LI data and applies the hash function using the hashing key to the ITIs to obtain ITIHVs. The processor executing the executable instructions further transmit the intercepted LI data to the LI core device if one of the ITIHVs matches the TIHV.

According to yet another embodiment, there is an LI core device in a radio communication system including a decision module, a hashed-value calculator, a data storage unit and a transmitter. The decision module determines a hash function to be used by the LI core device and by an NE that is configured to intercept LI data in the radio communication system. The hashed-value calculator calculates a TIHV corresponding to an LI target identifier using the hash function and a hashing key. The data storage unit stores an indication of the hash function, the hashing key and the TIHV. The transmitter sends the indication of the hash function, the hashing key and the TIHV to the NE.

According to yet another embodiment, there is an NE in a radio communication system including a receiver, a target identifier retriever, a hashed-value calculator and a transmitter. The receiver receives an indication of a hash function, a hashing key and a TIHV from an LI core. The target identifier retriever retrieves it is from intercepted LI data. The hashed-value calculator that applies the hash function using the hashing key to the ITIs to obtain ITIHVs. The transmitter transmits the intercepted LI data towards the LI core if one of the ITIHVs matches the TIHV.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 4 is a flowchart of a method performed by an LI core device according to an embodiment;

FIG. 7 a flowchart of a method performed by an NE according to an embodiment;

DETAILED DESCRIPTION

Figure 1:
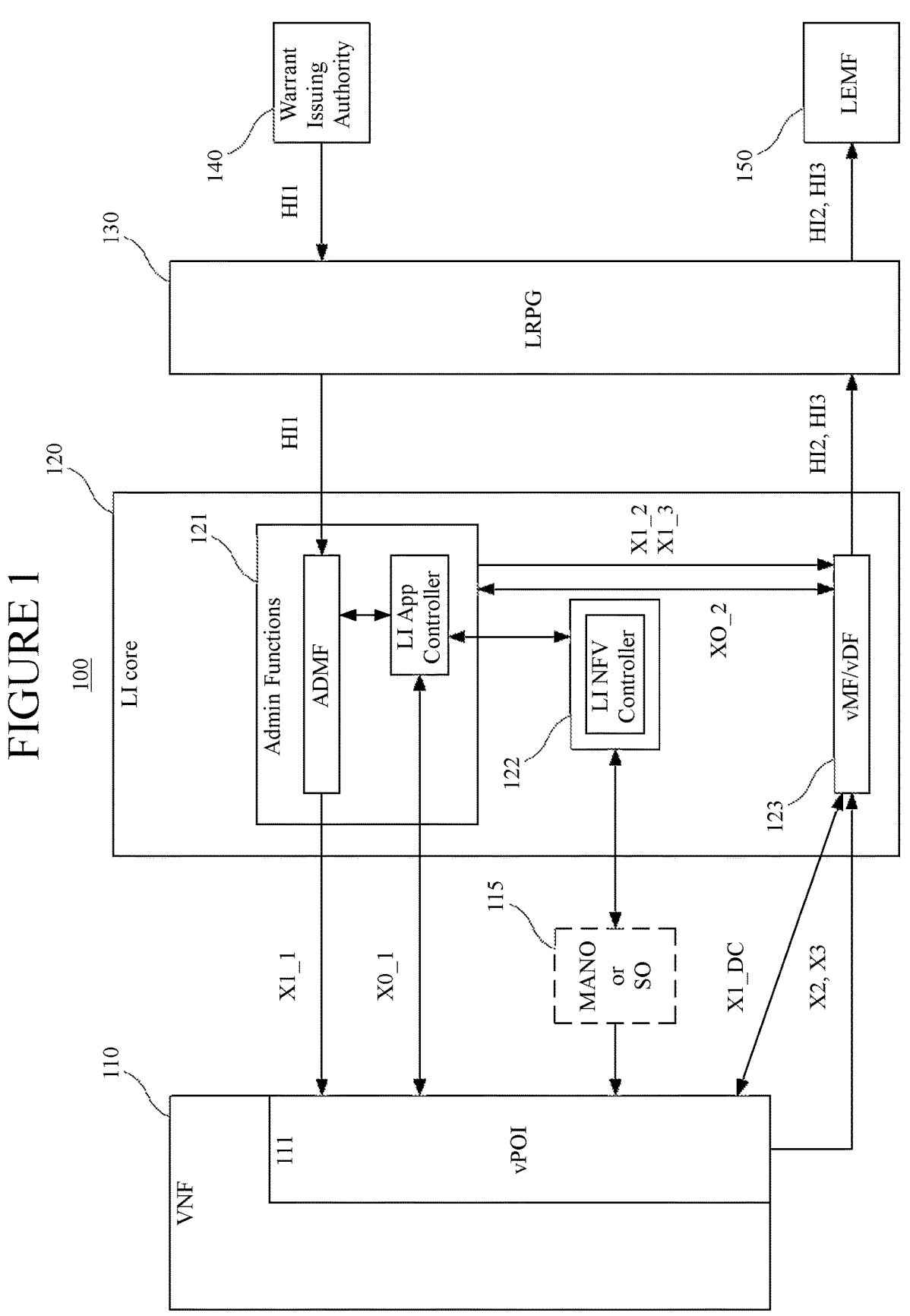
FIG. 1 illustrates an LI system architecture.

The meanings of some abbreviations used in this document are explained below:

3GPP 3rd Generation Partnership Project
5G 5$^{th}$ generation of cellular mobile communications
ADMF Administration Function; also used to generically represent an LI core function as in ETSI TS 103 221-1 V1.8.1
CC, xCC Content of Communication
CSP Communication Service Provider
DB Database
DF Distribution Function
ETSI European Telecommunications Standards Institute HI1, HI2, HI3 External Handover Interfaces
IMSI International Mobile Subscriber Identity
IMEI International Mobile Equipment Identity
IRI, xIRI Intercept Related Information
LEA Law Enforcement Agency
ITI Intercepted Target Identifier
ITIHV Intercepted Target Identifier Hashed Value
LEMF Law Enforcement Monitoring Facility
LI Lawful Interception
LIID LI instance identifiers
LRPG Lawful Interception Routing Proxy Gateway
MANO Management and Orchestration
MF Mediation Function
NE Network Element
NFV Network Functions Virtualization
POI Point Of Interception
SHA Secure Hash Algorithms
TI Target Identifier
TIHV Target Identifier Hashed Value
UUID Universally Unique Identifier
VNF Virtual Network Function
X1 LI interfaces internal to the CSP for management tasking and for xReportNEIssue delivery
X2, HI2 LI interfaces for internal (CSP) xIRI and external IRI delivery
X3, HI3 LI interfaces for internal (CSP) xCC and external CC delivery
XID Task ID
ZTD Zero Touch Deployment The following description of the embodiments refers to the accompanying drawings. The same reference numbers in different drawings identify the same or similar elements. The following detailed description does not limit the invention. Instead, the scope of the invention is defined by the appended claims. Some of the embodiments are described in a standardized (e.g., LTE, 5G, NVF context), but such a context is not to be considered a limitation for the described approaches to LI implementation in radio communication systems. A "radio communication system" means hardware and software cooperatively interconnected to provide wirelessly network services.

Reference throughout the specification to "one embodiment" or "an embodiment" means that a particular feature, structure or characteristic described in connection with an embodiment is included in at least one embodiment of the present invention. Thus, the appearance of the phrases "in one embodiment" or "in an embodiment" in various places throughout the specification is not necessarily all referring to the same embodiment. Further, the particular features, structures or characteristics may be combined in any suitable manner in one or more embodiments.

The embodiments described in this section are configured to allow an LI core device and an NE communicating, for example, via an X1 interface to agree (i.e., a handshake mechanism) on which one among commonly available hash functions (algorithms) to use. In case of upgrade of the hash function and/or hashing key the LI core device and the NE use, each of them updates stored information related to the LI tasks one by one, without interrupting LI monitoring for all the tasks at once. Thus, there is no longer an LI monitoring gap time during the update as in the conventional case. These added features are not in conflict with other conventional security mechanisms (e.g., generating the hashing keys as described in WO 2019/093932), which may be used in parallel.

The various embodiments may be embedded in an LI system such as system 100 illustrated in FIG. 1. The LI core intermediates between the law enforcement agency that supplies warrants specifying LI targets and type of interception and receives LI data (IRI and/or CC) on one side and network functions having attached points of interceptions. Virtualization of the functions is not required but it is currently favored as advantageous. The LI core performs one or more of administrative functions, mediation and/or delivery function, etc., related to LI, and hosted by one or more LI core device(s).

In FIG. 1, a point of interception virtual network function, vPOI, 111 is embedded in a trusted virtual network function, VNF, 110 (this figure is based on a similar one in the document "Network Functions Virtualisation (NFV); Security; Report on NFV LI Architecture," published by European Telecommunications Standards Institute (ETSI) as ETSI GR NVF-SEC 011 v1.1.1 in April 2018). The LI core 120 includes administrative functions 121, an LI NVF controller 122 that may be connected via a Management and Orchestration (MANO) entity 115 to vPOI 111, and a virtual mediation function/virtual distribution function (vMF/vDF) 123. Further, the Lawful Interception Routing Proxy Gateway (LRPG) 130 buffers between the LI core 120 on one side, and the warrant issuing authority 140 and the Law Enforcement Monitoring Function/Facility (LEMF) 150 on the other side. Communications between LI core 120 and vPOI 111 are performed via LI interfaces internal to the communication service provider (CSP): X0 (for configuring vPOI and transmitting other application parameters), X1 (for task management), X2 (for intercept-related information, xIRI, delivery to vMF), and X3 (for communication content, xCC, delivery to vMF). Communications between the LI core and devices outside the CSP take place via external handover interfaces HI1, HI2 and HI3. The LI core (ADMF) receives an LI request from LEA via HI1 and delivers (vDF) IRI and CC to LEMF via HI2 and HI3 interfaces, respectively.

Figure 2:
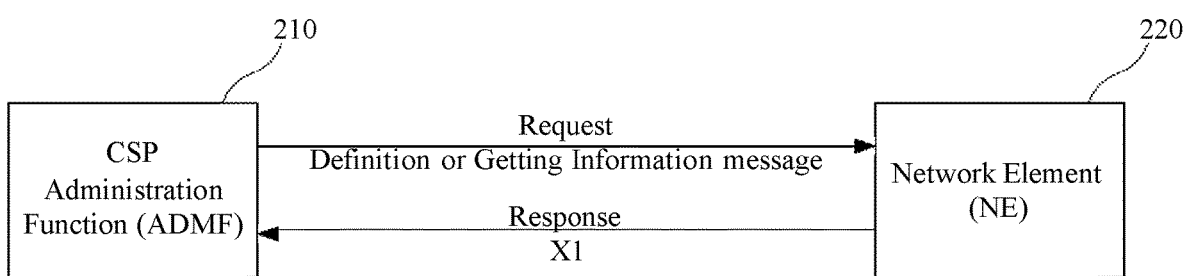
FIG. 2 illustrates a reference model with an X1 interface used between an ADMF (generically representing an LI core function) and an NE.

In a reference model (described in ETSI TS 103 221-1 V1.8.1 entitled "Lawful Interception (LI); Internal Network Interfaces; Part 1: X1" of April 2021) illustrated in FIG. 2, a bidirectional X1 interface is used for communication between a controlling function 210 (e.g., a CSP ADMinistration Function, ADMF), and a controlled function 220 (i.e., a Network Element, NE). Here, an NE is any network function (which may be a virtual function yet hosted on a device) employed to intercept and deliver LI data (IRI or CC), and ADMF represents any core function (which may also be a virtual function hosted by an LI core device) in communication with the NE and/or the LEA's device(s).

The messages exchanged via the X1 interface include messages for starting, modifying and stopping tasks (detailed in section 6.2 of ETSI TS 103 221-1 V1.8.1), messages for creating, modifying and removing destinations (detailed in section 6.3) and messages for getting information from the NE (detailed in section 6.4).

ActivateTask and ModifyTask messages sent from the ADMF to an NE to add a new LI task or modify an existing task, respectively, typically include a TASKDetail structure with plural fields: XID that uniquely identifies the task, TargetIdentifiers that identifies the LI targets, DeliveryType (IRI, CC or both), etc. TargetIdentifiers may be an E164Number, an International Mobile Subscriber Identity—IMSI, an International Mobile station Equipment Identity—IMEI, etc. The TargetIdentifiers field may be hashed before being transmitted or stored, to prevent malicious interference.

Figure 3:
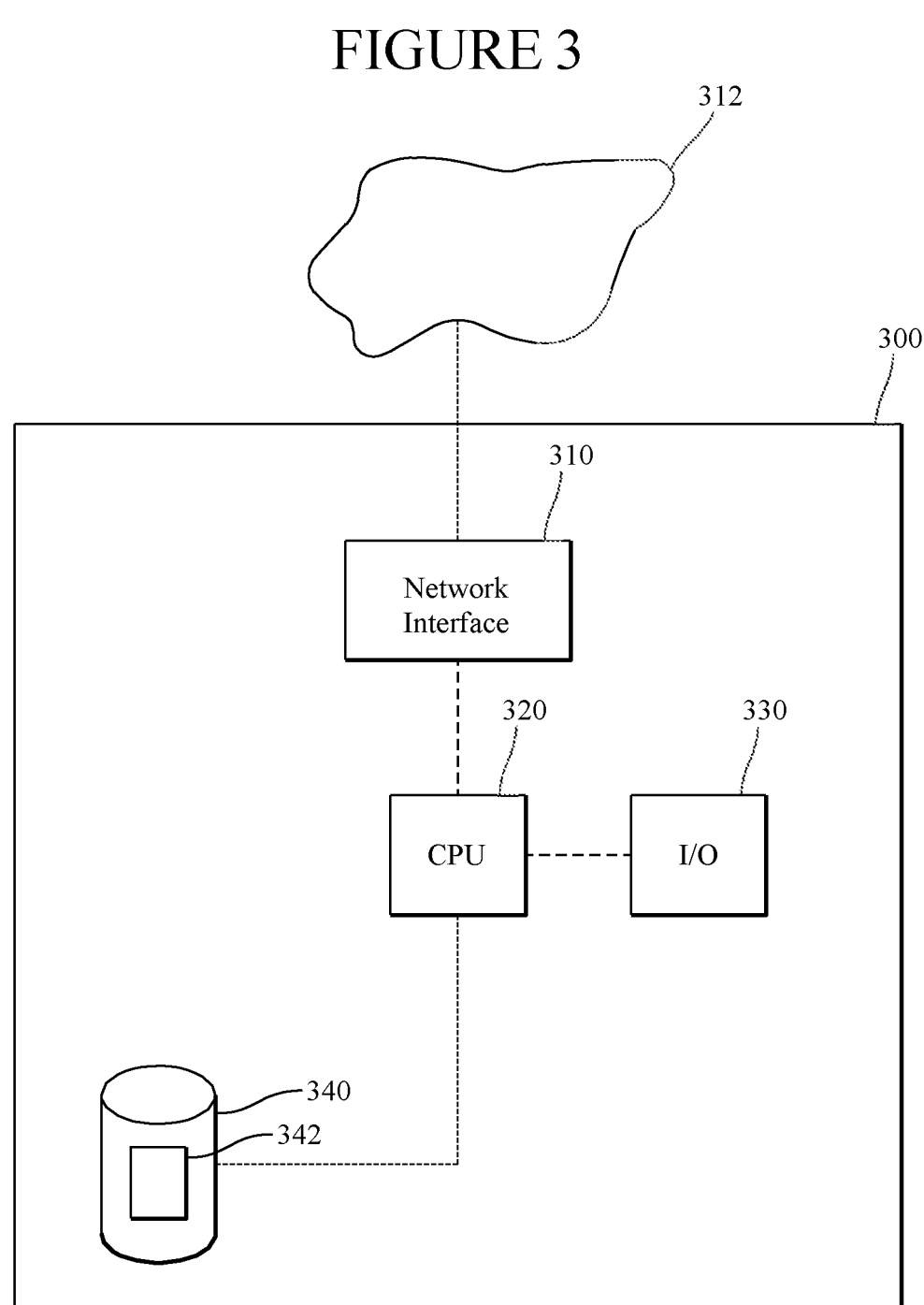
FIG. 3 is a block diagram of a device configured to operate in a radio communication system.

The LI core device may have the structure illustrated in FIG. 3. Device 300 includes a network interface 310 (i.e., input/output circuitry, e.g., a transceiver, or a receiver and a transmitter) enabling transmitting and receiving signals to/from other devices in radio communication system 312. Device 300 further includes CPU 320 having at least one processor and connected to the interface 310, and a memory 340 that may store CPU/processor executable instructions 342. Device 300 may optionally include a user interface 330 connected to CPU 320.

An LI core device according to an embodiment is configured to perform the method 400 illustrated in FIG. 4. The LI core device executes one of the LI core functions, and it is therefore hereinafter called "ADMF." A task lasts in NE from receiving an ActivateTask message (i.e., a request is sent by the ADMF) until: (1) receiving a DeactivateTask message (i.e., a request sent by the ADMF to end the task), (2) a "terminating fault" occurs, or (3) the NE determines that the task has completed (if the ImplicitDeactivationAllowed flag has been set).

Method 400 includes, at S410, determining a hash function among site-available hash functions usable by the LI core device and by an NE that is configured to intercept communications in the radio communication system. This step indicates existence of a handshake mechanism for selecting a hash function that is commonly available to the LI core device and the NE, to encrypt target identifiers.

In order to determine the hash function, ADMF may send a list indicating the site-available hash functions to the NE, and the NE may then return a list indicating NE-available hash functions that are among the site-available hash functions. In one embodiment, two new messages, SecurityTaskDetailRequest and SecurityTaskDetailResponse, are added to the relevant LI standard for facilitating a hash function list exchange.

Figure 5:
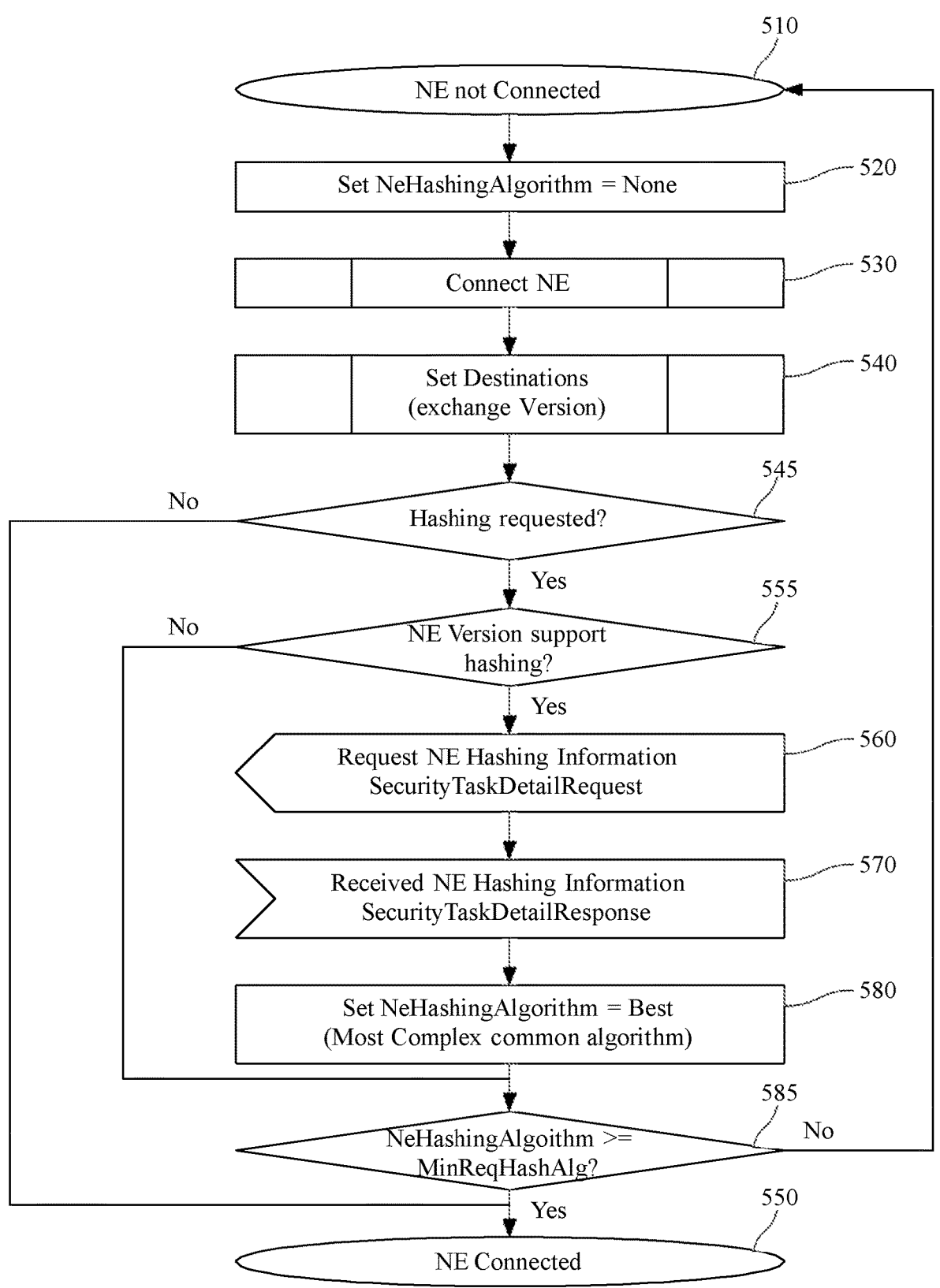
FIG. 5 illustrates hash function selection according to an embodiment.

FIG. 5 illustrates a scenario in which a hash function is selected using such new messages. Starting at 510, with NE not connected, a variable NeHashingAlgorithm is set to None at 520. Then, at 530, the NE is connected to the LI-ADMF (a preliminary connection that may become operative at 550 or declined at 585). At 540, intercepted LI data destinations are created. On X1, each task is uniquely identified by an X1 identifier (XID) and it is handled independently of all others and is released once the task has ended. According to the current standard, the XID is a version 4 UUID as per IETF RFC 4122 "A Universally Unique Identifier (UUID) URN Namespace." The ADMF is responsible for correlating the XID to any LI instance identifiers (LIID) used to communicate with law enforcement entities. The ADMF may map an XID to a single LIID or to multiple LIIDs. The LIID(s) or more precisely the MF/DF(s) thereof is/are the destination(s).

Intercepted traffic is delivered by the NE to at least one destination (i.e., an MF/DF that may be virtual). Each destination is uniquely identified by a destination identifier handled independently from other details of the task. Each task is associated with one or more destinations. Prior to associating a task with a destination identifier, the destination identifier has to have been created (which happens at 540). Note that a conventional LI core (that does not support selecting the hash function) performs only steps 510, 530, 540 and 550.

Returning to the embodiment illustrated in FIG. 5, at 545 it is tested whether hashing is requested for the NE deployment. If hashing is not requested (i.e., NO branch of 545), then step 550 follows the NE being operatively connected to the LI core. If the hashing is requested (YES branch of 545), then the default it is tested whether NE's version of software supports selecting a hash function at 555.

If NE's version of software does not support selecting the hash function (i.e., NO branch of 555), then step 585 follows using NeHashingAlgorithm=None (set in step 520). Step 585 checks if NeHashingAlgorithm value is acceptable (i.e., greater or equal to MinReqHashAlg). If NeHashingAlgorithm value is not acceptable then NE's connection is declined (i.e., NO branch of 585), otherwise (i.e., YES branch of 585) NE is operatively connected to the LI core.

If NE's version of software supports selecting a hash function (i.e., YES branch of 555), the ADMF requests hashing information from the NE at 560 and receives NE's response at 570. In the embodiment illustrated in FIG. 5, ADMF's request for NE's hashing information uses a SecurityTaskDetailRequest message. The SecurityTaskDetailRequest message may have a field HashingAlgorithm that includes a list of hash functions available to ADMF. This list may be, for example, a list of numbers corresponding to known hashing algorithms (i.e., indicating hash functions). For example, the field HashingAlgorithm may be a list of numbers (3, 4, 6). In view of previously established convention, that 0 indicates no hashing, 1 indicates SHA-0, 2: SHA-1, 3: SHA-224; 4: SHA-256; 5: SHA-384; 6: SHA-512; 7: SHA-3 (SHA being a family of cryptographic hash functions published by the National Institute of Standards and Technology). Thus, the list (3, 4, 6) indicates that functions implementing SHA-224, SHA-256 and SHA-512 are available for use by LI core. Alternatively, the list may include hash function names: (SHA-224, SHA-256, SHA-512) instead of (3, 4, 6). In one embodiment, the field HashingAlgorithm of the SecurityTaskDetailRequest message may be empty providing no information about the hash function available to the ADMF.

Then, at step 570, the NE sends back a SecurityTaskDetailResponse message including a list of NE-available hash functions. Similar to the SecurityTaskDetailRequest message, the SecurityTaskDetailResponse message has a HashingAlgorithm field with a list of numbers or hash algorithm names. For example, if the SecurityTaskDetailRequest message indicated (3, 4, 6) or (SHA-224, SHA-256, SHA-512), the HashingAlgorithm field of the SecurityTaskDetailResponse message may include (3, 6) or (SHA-224, SHA-512), that is, a subset of the hash functions available to the ADMF. In case the SecurityTaskDetailRequest message did not indicate hash function(s), the SecurityTaskDetailResponse message may return a list with all the hash functions available to the NE (e.g., (1, 3, 6) or (SHA-0, SHA-224, SHA-226)). In one embodiment, the NE may return only the best (most complex) among the hash functions that the NE can use (e.g., (6) or (SHA-512)).

After receiving the NE's response, at 580, the ADMF sets the NeHashingAlgorithm's value equal to the hash function to be used by both ADMF and NE for securing TargetIdentifiers before storing and/or transmitting. For example, the NeHashingAlgorithm is set to be best (i.e., the most complex) among the commonly available algorithms. Alternatively, a hashing algorithm providing the best compromise between security and execution speed may be preferred.

Then, at 585, NeHashingAlgorithm's value may be compared with a predetermined value representing a minimum required complexity of the hashing algorithm. If the selected hash function does not meet the minim required complexity (MinReqHasAlg), the NE's operative connection is denied. An error message may be sent to the NE to signal that the NE does not support the minimum required complexity of the hash function. Note that MinReqHashAlg=None means that even if the use of hashing algorithm is desirable, it is not mandatory, and target identifiers may be sent as plaintext to the NE. If the selected hash function equals or exceeds the minim required complexity (MinReqHashAlg), NE is operatively connected to the LI core at 550.

Returning now to FIG. 4, method 400 further includes calculating a target identifier hashed value, TIHV, corresponding to an LI target identifier using the hash function and a hashing key at S420. The hashing key may be selected from a predetermined list of hashing keys or may be at least partially randomly generated (for example, using one of the methods discussed in WO 2019/093932).

Method 400 further includes storing an indication of the hash function, the hashing key and the TIHV at S430. This information may be organized as a database.

Further at S440, method 400 includes transmitting an indication of the hash function, the hashing key and the TIHV to the NE. One way of transmitting this information is by using a modified ActivateTask message. The conventional ActivateTask message defined in the ETSI TS 103 221-1 standard may be improved for this purpose by adding a field named SecureTargetIdentifier in the TaskDetails structure. In one embodiment, the SecureTarget/dentifier field is filled with information when target identifier is not transmitted as plaintext. SecureTargetIdentifier field has a SecurityDetails format that includes: a HashingAlgorithm (number or alpha-numeric) indicating the selected hash function, a TargetType (a UTF-8 string) indicating format of the target identifier prior to being hashed (e.g., IMSI, IMEI, etc.), a HashedTarget (also a UTF-8 string) containing the TIHV, and a KEY (another UTF-8 string) providing the key used by the hash function to encrypt the target identifier. Optionally, an OtherInfoHashedfield may also be included in the SecurityDetails format and be used to indicate other hash-related information (e.g., other information hashed together with the target identifier). Since the ModifyTask message uses the same TaskDetails structure, it benefits from the presence of the additional SecureTargetIdentifier.

The presence of the SecureTargetIdentifier field in the TaskDetails structure makes it easier and faster to enhance secure handling of hashed LI target identifiers as described for the embodiments in this section. The embodiments include an automatic handshake mechanism for establishing security details such as the hash function (i.e., hashing algorithm), keys and any other security parameters, as well as to update these characteristics in case changes are caused by discovered vulnerabilities. The automatic handshake mechanism increases the security and serviceability also in 5G LI networks.

Figure 6:
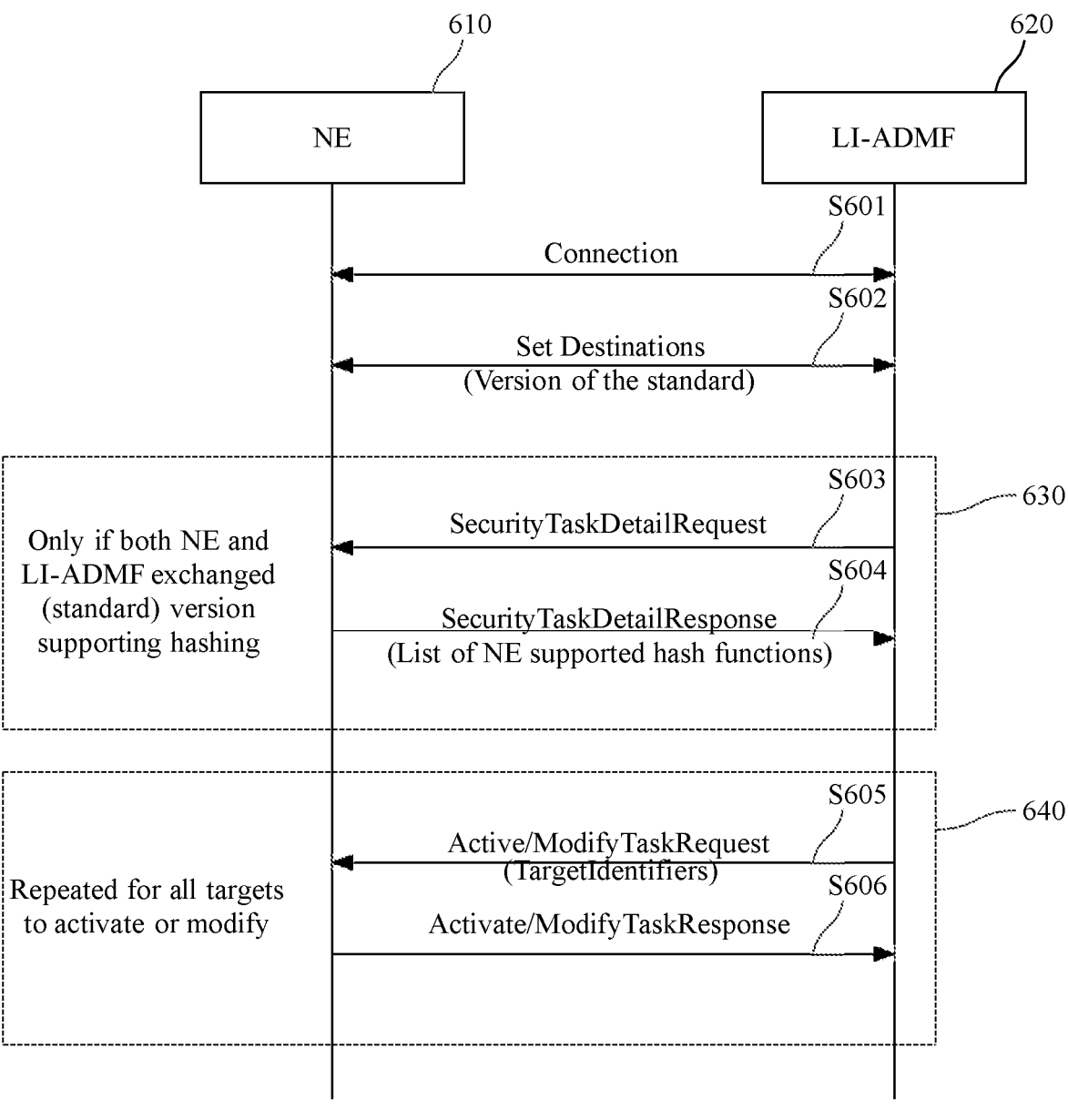
FIG. 6 illustrates interaction between an NE and an LI core device according to an embodiment.

FIG. 6 illustrates a scenario in which an NE 610 and LI-ADMF 620 interact, both being able to perform methods using the handshake mechanism to establish and update the hash function used for securing the LI target identifier(s). At S601, NE 610 and ADMF 620 connect and then, at S602, intercepted LI data destinations are set.

In section 630 (optional depending on whether both NE and LI-ADMF are configured to use the handshake mechanism for selecting the hash function to be used), the LI-ADMF 620 transmits the SecurityTaskDetailRequest message at S603, and the NE responds transmitting the SecurityTaskDetailResponse message at S604. The previously discussed variations of these messages are pertinent here (but are not repeated).

Section 640 is also optional in the sense that no LI task may occur. However, an LI task in which NE is required to intercept LI data (i.e., performs POI function) starts when the LI-ADMF 620 sends an ActivateTask request at S605, to which the NE 610 replies with an ActivateTask response at S606. In case both NE and LI-ADMF are configured to use the handshake mechanism for the hash functions, the Task-Details structure of the ActivateTask message includes the SecureTargetIdentifier field to convey the selected hash function, format of the target identifier prior to being hashed, TIHV and the hashing key.

NE 610 may also have a structure such as the one illustrated in FIG. 3, including an interface 310 (i.e., input/output circuitry, e.g., a transceiver, or a receiver and a transmitter) enabling it to communicate with other devices in a radio communication system, a CPU 320 with at least one processor connected to the interface and a memory 340 that may store CPU/processor executable instructions 342.

Besides intercepting LI data, the NE may be configured to perform a method 700 as illustrated in FIG. 7. Method 700 includes receiving an indication of a hash function, a hashing key and a TIHV from an LI-core (e.g., LI-ADMF 620) at S710, and retrieving intercepted target identifiers, ITIs, from intercepted LI data (IRI or CC) at S720. Note that LI data formatted to be transmitted on an X1 interface is known as xIRI or xCC, respectively. IRI and CC are reformatted by the MF/DF function before being transmitted on HI2 and HI3 interface, respectively, to LEMF. However, as the formatting aspect is not new and it is foreseeable to a person of skill in the art, the term "LI data" is used here for IRI's and CC's substantive content without emphasizing the formatting details.

Further, method 700 includes applying the hash function using the hash key to the intercepted TIs to obtain intercepted target identifiers hashed values, ITIHVs, at S730. Then, if one of the ITIHVs matches the TIHV received from the LI core device, the LI data is transmitted to ADMF (e.g., 120 in FIG. 1 or 620 in FIG. 6), at S740. In this context "ADMF" is used to generically represent an LI-core function executed by an LI-core device. NE may use an X2 or an X3 interface to deliver xIRI or xCC to ADMF.

Figure 8:
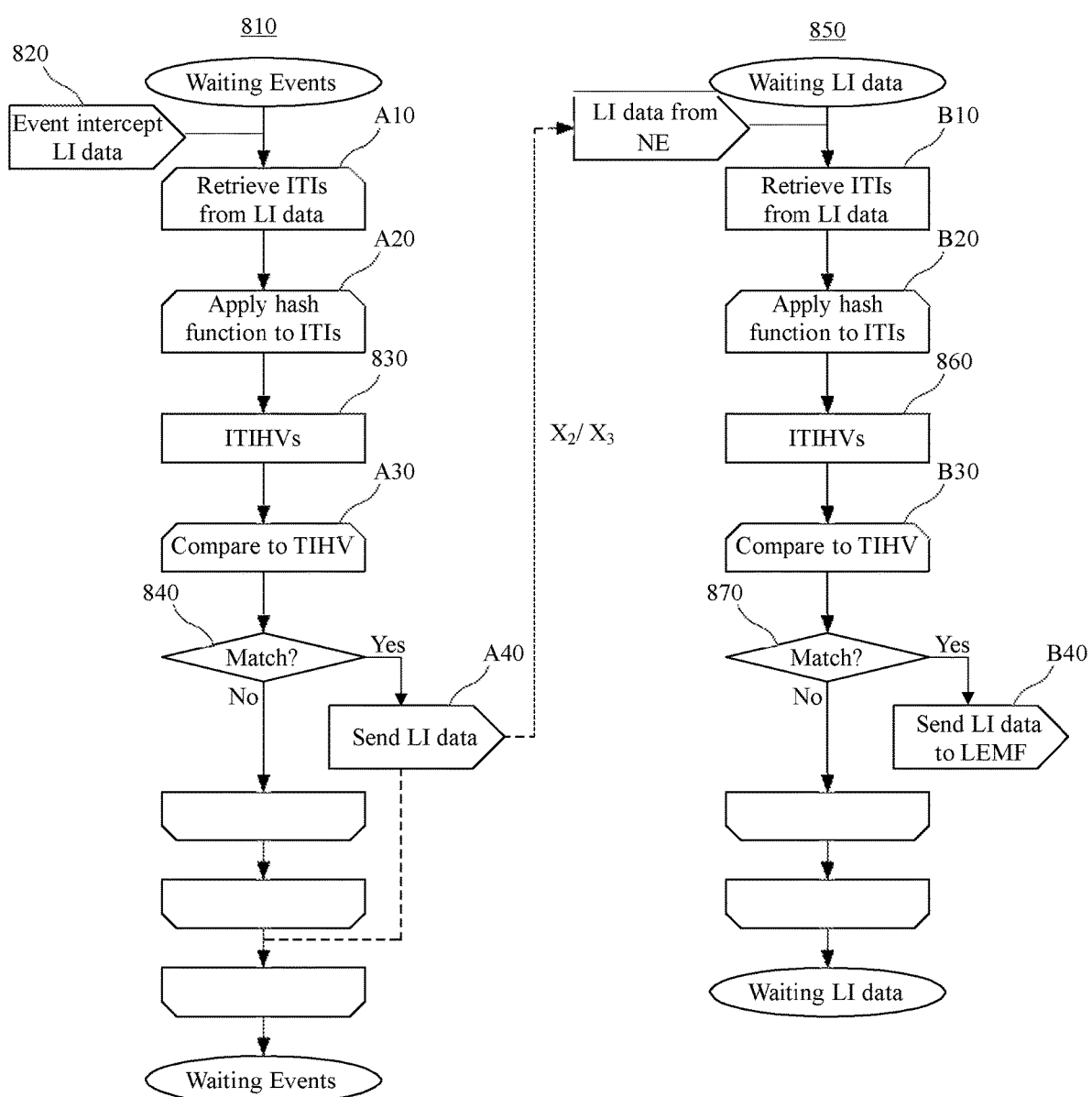
FIG. 8 is a flowchart illustrating target matching in an NE and an LI core device according to an embodiment.

FIG. 8 is a flowchart illustrating target matching in an NE 810 and an LI core function (ADMF) 850 according to an embodiment. Initially, NE awaits events, that is, LI data (IRI and/or CC) interception 820. At A10, NE 810 retrieves intercepted target identifiers, ITIs, from the intercepted LI data. Then, at A20, NE 810 applies the hash function(s) stored with corresponding keys to the ITIs to obtain intercepted target identifiers' hashed values, ITIHVs 830. Each of the ITIHVs is compared with each target identifier hashed value (TIHV) previously received by the NE (at the same time with a hash function indication and a hashing key) at A30. If there is a match of one of the ITIHVs with a respective TIHV (i.e., YES branch of 840), then LI data is sent to the LI core device via the X2 interface A40. If LI data is IRI, then it is formatted as xIRI when transmitted via the X2 interface. If LI data is CC, then it is formatted as xCC and transmitted on an X3 interface.

Initially, ADMF 850 waits LI data (IRI and/or CC). Upon receiving LI data, ADMF retrieves ITIs from the received LI data at B10. Then at B20, ADMF 850 applies the hash function(s) whose indication was stored in association with respective hashing key(s) to the ITIs to obtain ITIHVs 860. Each of the ITIHVs is compared with the stored TIHV(s) at B30. If there is a match of one of the ITIHVs with a TIHV at 870, then LI data is transmitted to the LEMF at B40. The LI-ADMF may use an HI2 or HI3 interface to deliver LI data to the LEMF. In view of it receiving LI data and forwarding it to LEMF, the ADMF 850 illustrated in FIG. 8 performs an LI mediation and delivery function.

Note that it is possible (though not favored) the LI-ADMF to store the target identifier(s) as plaintext and then B20-

860-B30 are replaced by plaintext comparison. It is also possible, the LI-data be forwarded to more than one LEA (destination).

The time required for the matching depends by the number of hash function/key used, so this number should preferably be small. For example, one algorithm/key pair may be used and a second one may be introduced only periodically or when a threat or security violation incident occurs. The update of the hash function and hashing key occurs gradually, target by target as further explained, so no LI monitoring gaps occur.

If the hash function (hashing algorithm) and hashing key are changed (change triggered, for example, by the NE), the hash information (i.e., the indication of the hash function, the hashing key and the target identifier hashed value for each active task, that may be organized in a database) stored by the LI core and by the NE has to be updated. In the LI core, both old hash function/key and new hash function/key are applied to intercepted target identifiers, ITIs. If one of the ITI's hashed values obtained with the old hash function/key matches a stored target identifier hashed value (obtained using the old hash function/key), the information corresponding to the matched target is replaced with the indication of the new hash function and hashing key and the target identifier hashed value obtained by applying the new hash function and hashing key to the matched target identifier. The LI core device then sends the indication of the new hash function and hashing key and the target identifier hashed value obtained by applying the new hash function to the NE so the information is also updated there. Applying old hash function/key continues until database includes no stored indication to use the old hash function/key. Once a task ends, the task-related information is deleted.

Figure 9:
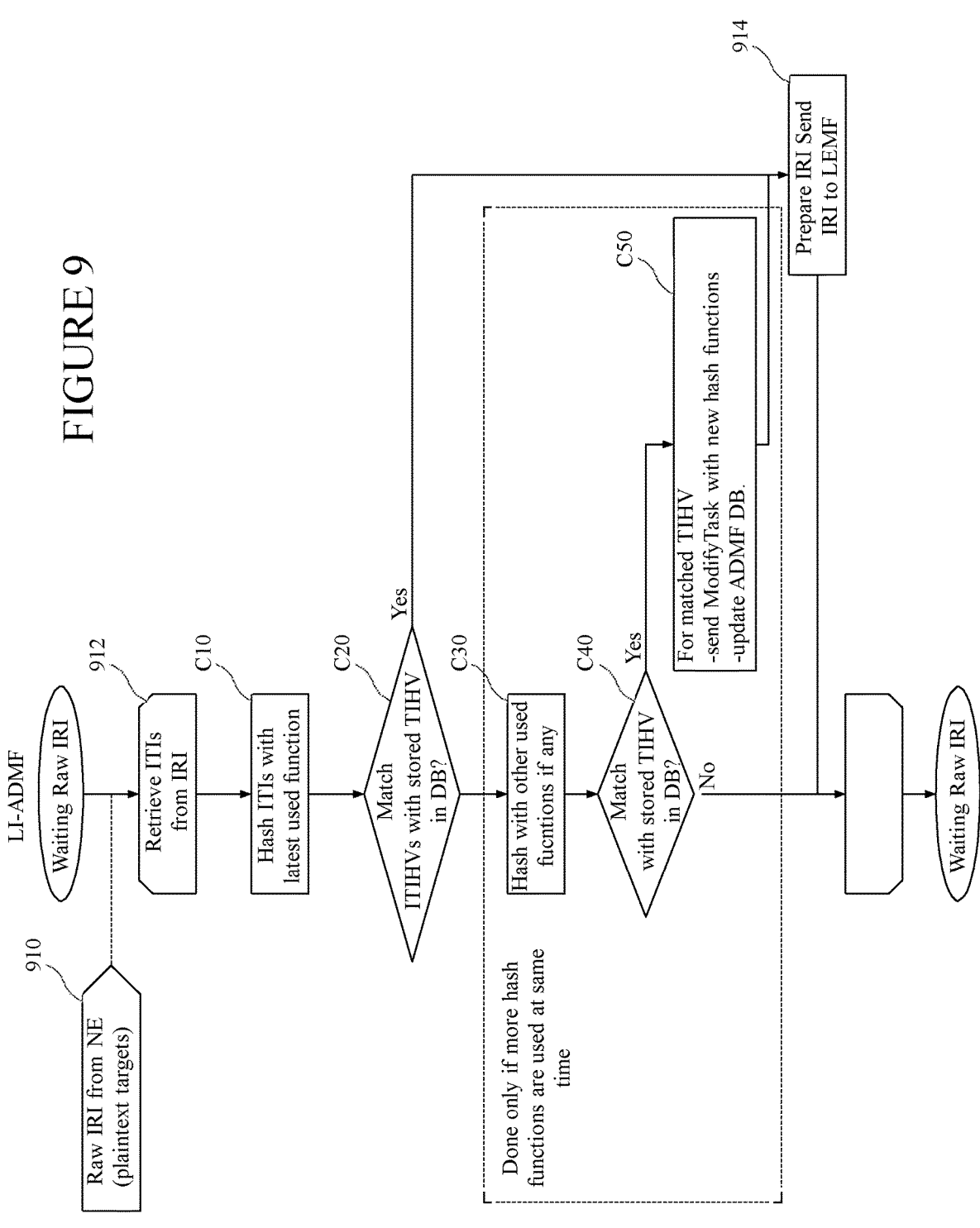
FIG. 9 illustrates actions performed by an LI core device during a gradual change from using an old hash function/key pair to using a new hash function/key pair according to an embodiment.

FIG. 9 illustrates actions performed by an LI core device during a gradual change from using an old hash function/key to using a new hash function and/or key according to an embodiment. The ADMF may decide to update the hash function when learning that from the NE via a message SecurityTaskDetailResponse about a newly available, more secure/complex hash function. The LI core or LEA may discover a malicious security attack and trigger change of the hash function and hashing key pair. Alternatively, the ADMF may periodically (though not frequently) initiate such a change of the hash function and hashing key pair. If the hash function is changed, a more secure (complex) hash function is desirable; if a more desirable hash function is not available, the change may be limited to the hashing key.

Most securely, neither the LI core device nor the NE have the active target identifier(s) plaintext available to apply the new hash function with the new hashing key. Therefore, upon receiving LI data (IRI) 910, for each intercepted target identifier 912, the LI core applies the new hash function with the new hashing key at C10. If a resulting hashed target identifier value matches a stored hashed target value (i.e., "YES" branch of C20) then the LI data is forwarded to LEMF at 914.

Otherwise (i.e., "No" branch of C20), the LI core applies the old hash function with the old hashing key to the possible target identifiers at C30. If a hashed target identifier value thus obtained matches a stored hashed target value (i.e., "YES" branch of C40) then, for the matched target identifier, the LI core sends a ModifyTask message to NE and updates the corresponding stored target identifier information at C50. That is, in the LI core database, the old hash function and hashing key are replaced the new hash function and hashing key, and the hash target identifier value obtained with the old hash function and hashing key is replaced by the hash target identifier value obtained with the new hash function and hashing key. Also, LI core forwards the LI data to LEMF at 914. Otherwise (i.e., "NO" branch of C40) no other action is taken, the LI core waiting for other intercepted data.

The NE and the LI core may apply both the old hash function with old hashing key and the new hash function with the new hashing key to the intercepted target identifiers retrieved from the LI data. If one of the intercepted target identifiers' hashed values obtained using the old hash function matches a stored target identifier hashed value that was obtained using the old hash function, then the corresponding intercepted target identifier is an LI target. The new hash function with the new hash key is applied to generate the new TIHV; an indication of the new hash function, the new hash key and the new TIHV replace the stored indication of the old hash function, the old hash key and the old TIHV. Meanwhile also the LI data is forwarded toward the LEMF.

Thus, some of the embodiments provide the advantage of a gradual change of the information stored in the NE and the LI core device when the hash function is changed.

Figure 10:
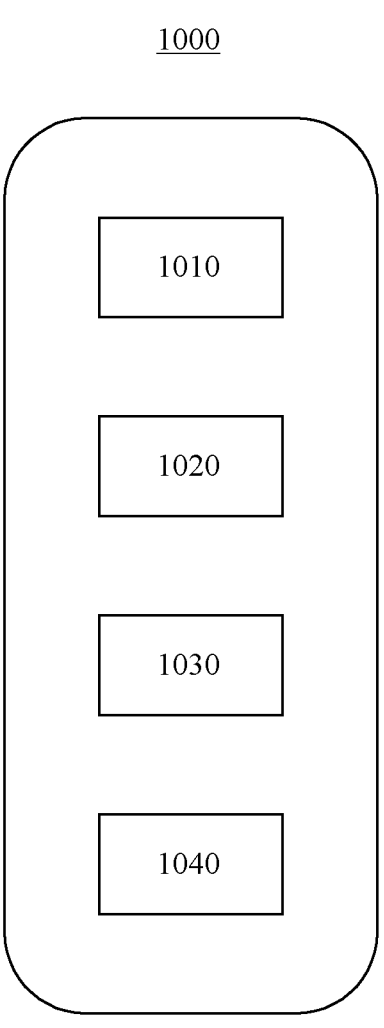
FIG. 10 is a diagram of an LI core device according to an embodiment.

An LI core device in a radio communication system may have a modular structure as illustrated in FIG. 10. LI core device 1000 includes a decision module 1010, a hashed-value calculator 1020, a data storage unit 1030 and a transmitter 1040. Decision module 1010 determines a hash function to be used by the LI device and by a network element, NE, which is configured to intercept LI data in the radio communication system. Hashed-value calculator 1020 calculates a TIHV corresponding to an LI target identifier using the hash function and a hashing key. Data storage unit 1030 stores an indication of the hash function, the hashing key and the TIHV. The transmitter 1040 sends the indication of the hash function, the hashing key and the TIHV to the NE.

Figure 11:
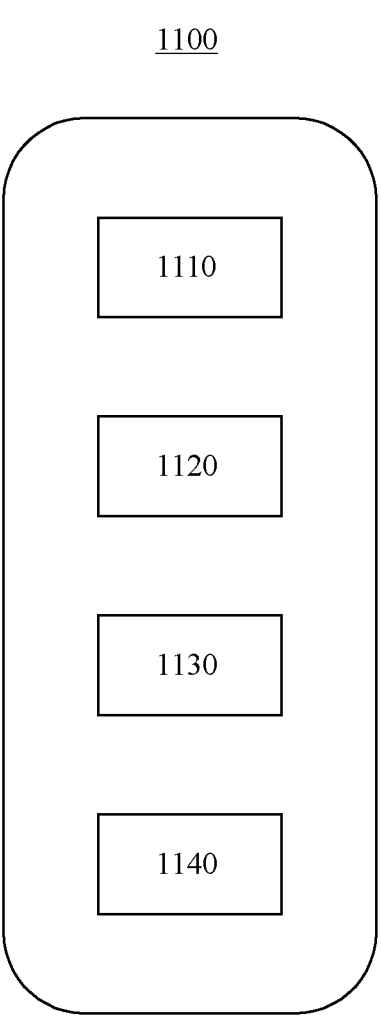
FIG. 11 is a diagram of an NE according to an embodiment.

An NE in a radio communication system may have a modular structure as illustrated in FIG. 11. NE 1100 includes a receiver 1110, a target identifier retriever 1120, a hashed-value calculator 1130 and a transmitter 1140. Receiver 1110 receives an indication of a hash function, a hashing key and a TIHV. Target identifier retriever 1120 retrieves ITIs from intercepted LI data. Hash-vale calculator 1130 applies the hash function using the hashing key to the ITIs to obtain ITIHVs. Transmitter 1140 transmits the intercepted LI data toward a law enforcement monitoring facility, LEMF, if one of the ITIHVs matches the TIHV.

The embodiments described in this section increase the serviceability of LI-related software updated with the additional information fields of messages that allow exchange of security-related details via X1 interface. The hash function to be used by LI core and each NE may be established automatically (without human intervention) and directly. This approach allows automatic and dynamic network management topology. Updating conventional LI software to a version including the additional features of these embodiments can be a Zero Touch Deployment, ZTD (i.e., no hardware update required).

Further, the embodiments practically eliminate LI monitoring outages when the hash function is updated and increase security by allowing secure target ID being sent over the X1 interface and allowing strong encryption. Implementation of multiple NEs in LI core is also simplified.

The disclosed embodiments provide methods and radio communication systems that provide a handshake mechanism for selecting a hash function and gradual change of hashed values in NE and LI core devices. Additionally, transition from an old hash function to a new hash function is performed gradually as target-related actions occur in the LI core device, thereby avoiding LI monitoring gaps. It should be understood that this description is not intended to limit the invention. On the contrary, the embodiments are intended to cover alternatives, modifications and equivalents, which are included in the spirit and scope of the invention. Further, in the detailed description of the embodiments, numerous specific details are set forth in order to provide a comprehensive understanding of the claimed invention. However, one skilled in the art would understand that various embodiments may be practiced without such specific details.

Figure 12:
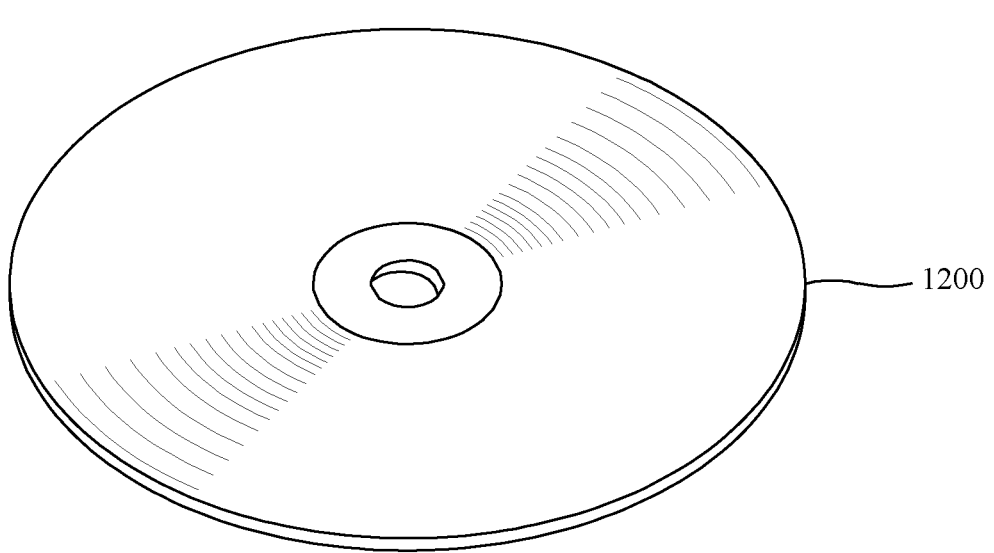
FIG. 12 illustrates an electronic storage medium on which computer program embodiments can be stored.

As also will be appreciated by one skilled in the art, the embodiments may take the form of an entirely hardware embodiment or an embodiment combining hardware and software aspects. Further, the embodiments, e.g., the configurations and other logic associated with the charging process to include embodiments described herein, such as the methods associated with FIGS. 4, and 7 may take the form of a computer program product stored on a computer-readable storage medium having computer-readable instructions embodied in the medium. For example, FIG. 12 depicts a computer readable storage medium 1200 on which computer program embodiments can be stored. Any suitable computer-readable storage medium may be utilized, including hard disks, CD-ROMs, digital versatile disc (DVD), optical storage devices, or magnetic storage devices such as floppy disk or magnetic tape. Other non-limiting examples of computer-readable media include flash-type memories or other known memories.

Although the features and elements of the present embodiments are described in the embodiments in particular combinations, each feature or element can be used alone without the other features and elements of the embodiments or in various combinations with or without other features and elements disclosed herein. The methods or flowcharts provided in the present application may be implemented in a computer program, software or firmware tangibly embodied in a computer-readable storage medium for execution by a specifically programmed computer or processor.

The invention claimed is:

1. A method performed by a lawful interception, LI, core device in a radio communication system, the method comprising:

determining a hash function to be used by the LI core device and by a network element, NE, that is configured to intercept LI data in the radio communication system;

calculating a target identifier hashed value, TIHV, corresponding to an LI target identifier, using the hash function and a hashing key;

storing an indication of the hash function, the hashing key and the TIHV; and transmitting the indication of the hash function, the hashing key and the TIHV to the NE, and wherein the determining of the hash function includes:

sending a first list of hash functions that are available for use by the LI core device; and receiving a second list of hash functions that are available for use by the NE, and wherein the hash function has a highest complexity among one or more hash functions included in both the first list and the second list.

2. The method of claim 1, wherein if the highest complexity is less than a predetermined minimum required complexity, an operative connection of the NE to the LI core device is denied.

3. The method of claim 1, further comprising:

retrieving intercepted target identifiers, ITIs, from LI data received from the NE;

applying the hash function using the hashing key to the ITIs to generate ITIs hashed values, ITIHVs; and if one of the ITIHVs matches the TIHV, forwarding the LI data to a law enforcement monitoring facility, LEMF.

4. The method of claim 3, further comprising:

calculating at least another TIHV corresponding to at least another LI target identifier, using the hash function and the hashing key;

storing the indication of the hash function, the hashing key and the at least another TIHV; and transmitting the indication of the hash function, the hashing key and the at least another TIHV to the NE if one of the ITIHVs matches the at least another TIHV, forwarding the intercepted LI data to the law enforcement monitoring facility, LEMF.

5. The method of claim 4, further comprising:

calculating an updated TIHV and an updated at least another TIHV using an updated hash function and/or an updated hashing key;

generating updated ITIHVs by applying the updated hash function and/or the updated hashing key to the intercepted TIs; and if one of the updated ITIHVs matches the updated TIHV or the updated at least another TIHV, forwarding the intercepted LI data to the LEMF;

if one of the ITIHVs has matched the TIHV, transmitting a current hash function indication, a current hashing key with the updated TIHV to the NE; and if one of the ITIHVs matches the at least another TIHV, transmitting the current hash function indication, the current hashing key and the updated at least another TIHV to the NE, and replacing the stored indication of the hash function, the hashing key and the TIHV with the current hash function indication, the current hashing key and the updated TIHV, wherein the current hash function indication and the current hashing key identify the updated hash function and/or the updated hashing key used to calculate the updated TIHV and the updated at least another TIHV.

6. The method of claim 1, wherein the LI core device performs an LI administration function and/or an LI mediation and delivery function.

7. The method of claim 1, wherein communication between the LI core device and the NE is performed via an X1 interface.

8. A method performed by a network element, NE, configured to intercept communications, the method comprising:

receiving a first list of hash functions that are available for use by a lawful interception, LI, core device;

transmitting a second list indicating one or more hash functions usable by the NE, wherein the one or more hash functions usable by the NE and included in the second list are among the hash functions in the first list;

receiving an indication of a hash function, a hashing key and a target identifier hashed value, TIHV, from a lawful interception, LI, core device;

retrieving intercepted target identifiers, ITIs, from intercepted LI data;

applying the hash function using the hashing key to the intercepted TIs to obtain intercepted TI hashed values, ITIHVs; and if one of the ITIHVs matches the TIHV, transmitting (S740) the intercepted LI data to the LI core device.

9. The method of claim 8, further comprising:

receiving an indication of the hash function, the hashing key and at least another TIHV; and if one of the ITIHVs matches the at least another TIHV, transmitting the intercepted LI data towards the LEMF.

10. A lawful interception, LI, core device in a radio communication system, the LI core device comprising input/output circuitry, a processor and a memory storing executable instructions that when executed by the processor make the processor to:

determine a hash function to be used by the LI core device and by a network element, NE, that is configured to intercept LI data in the radio communication system;

calculate a target identifier hashed value, TIHV, corresponding to an LI target identifier, using the hash function and a hashing key;

store an indication of the hash function, the hashing key and the TIHV in the memory; and transmit the indication of the hash function, the hashing key and the TIHV via the input/output circuitry to the NE, and wherein when determining the hash function, the executable instructions are executed by the processor to make the processor to:

send a first list of hash functions that are available for use by the LI core device; and receive a second list of hash functions that are available for use by the NE, and wherein the hash function has a highest complexity among one or more hash functions included in both the first list and the second list.

11. The LI core device of claim 10, wherein, if the highest complexity is less than a predetermined minimum required complexity, an operative connection of the NE to the LI core device is denied.

12. The LI core device of claim 10, wherein the executable instructions, when executed by the processor further make the processor to:

retrieve intercepted target identifiers, ITIs, from LI data received from the NE via the input/output circuitry;

apply the hash function using the hashing key to the ITIs to generate ITIs hashed values, ITIHVs; and if one of the ITIHVs matches the TIHV, forward the LI data to a law enforcement monitoring facility, LEMF, via the input/output circuitry.

13. The LI core device of claim 12, wherein the executable instructions, when executed by the processor further make the processor to:

calculate at least another TIHV corresponding to at least another LI target identifier, using the hash function and the hashing key;

store the indication of the hash function, the hashing key and the at least another TIHV in the memory; and transmit the indication of the hash function, the hashing key and the at least another TIHV to the NE via the input/output circuitry;

if one of the ITIHVs matches the at least another TIHV, forwarding the intercepted LI data to the law enforcement monitoring facility, LEMF, via the input/output circuitry.

14. The LI device of claim 13, wherein the executable instructions, when executed by the processor further make the processor to:

calculate an updated TIHV and an updated at least another TIHV using an updated hash function and/or an updated hashing key;

apply the updated hash function and/or the updated hashing key to the ITIs to generate updated ITIHVs; and if one of the updated ITIHVs matches the updated TIHV or the updated at least another TIHV, forward the intercepted LI data to the LEMF via the input/output circuitry;

else if one of the ITIHVs has matched the TIHV, transmit a current hash function indication, a current hashing key with the updated TIHV to the NE via the input/output circuitry; and else if one of the ITIHVs matches the at least another TIHV, transmit the current hash function indication, the current hashing key and the updated at least another TIHV to the NE via the input/output circuitry, and replace the stored indication of the hash function, the hashing key and the TIHV with the current hash function indication, the current hashing key and the updated TIHV, wherein the current hash function indication and the current hashing key identify the updated hash function and/or the updated hashing key used to calculate the updated TIHV and the updated at least another TIHV.

15. A network element, NE, in a radio communication system, the NE comprising input/output circuitry, a processor and a memory storing executable instructions that when executed by the processor make the processor to:

receive a first list of hash functions that are available for use by a lawful interception, LI, core device;

transmit a second list indicating one or more hash functions usable by the NE; wherein the one or more hash functions usable by the NE and included in the second list are among the hash functions in the first list;

receive an indication of a hash function, a hashing key with a target identifier hashed value, TIHV, from a lawful interception, LI, core device via the input/output circuitry;

retrieve intercepted target identifiers, ITIs, from intercepted LI data;

apply the hash function using the hashing key to the ITIs to obtain intercepted TI hashed values, ITIHVs; and if one of the ITIHVs matches the TIHV, transmit the intercepted LI data to the LI core device.

16. The NE of claim 15, wherein the executable instructions, when executed by the processor, further make the processor to:

receive an indication of the hash function, the hashing key and at least another TIHV; and if one of the intercepted TI hashed values matches the at least another TIHV, transmit the intercepted LI data towards the LEMF.

\* \* \* \* \*